United States Patent [19]

Ainslie

[11] Patent Number: 5,385,604
[45] Date of Patent: Jan. 31, 1995

[54] GERMICIDE RESISTANT FLOOR FINISH

[75] Inventor: Neil T. Ainslie, Fort Wayne, Ind.

[73] Assignee: Huntington Laboratories, Inc., Huntington, Ind.

[21] Appl. No.: 170,153

[22] Filed: Dec. 20, 1993

[51] Int. Cl.$^6$ .............................................. C09D 5/14
[52] U.S. Cl. ................... 106/15.05; 106/10; 523/122
[58] Field of Search ............ 106/15.05, 3, 10; 523/122

[56] References Cited

U.S. PATENT DOCUMENTS

| | | | |
|---|---|---|---|
| 3,836,669 | 9/1974 | Dadekian | 514/642 |
| 3,855,170 | 12/1974 | Junkin et al. | 524/522 |
| 4,371,398 | 2/1983 | Forchielli | 106/10 |
| 4,704,429 | 11/1987 | Hackett et al. | 106/10 |
| 4,749,411 | 6/1988 | Chapin | 106/10 |

FOREIGN PATENT DOCUMENTS

0562730A1  9/1993  European Pat. Off. .

Primary Examiner—Anthony Green
Attorney, Agent, or Firm—Barnes & Thornburg

[57] ABSTRACT

Floor polish compositions having good resistance to germicide solutions are described. They comprise styrenated acrylic resins in combination with a rosin ester resin, a wax and other floor finish functional ingredients. Optimum floor polish performance characteristics are obtained when the weight ratio of the rosin ester and wax is greater than one and when the weight ratio of the styrenated acrylic resin to the total weight of the rosin ester resin and wax components is between about 3:1 and about 7:1.

5 Claims, No Drawings

GERMICIDE RESISTANT FLOOR FINISH

FIELD OF INVENTION

The present invention relates to floor coating compositions. More particularly it is directed to floor polish compositions which exhibit exceptional resistance to stripping by germicides.

BACKGROUND OF THE INVENTION

Floor finishes for commercial operations are often formulated to achieve a compromise of what tend to be mutually exclusive properties: high gloss, ease of repairability, slip resistance, scuff resistance, and detergent resistance. Floor finishes designed for use in healthcare facilities, however, have an additional requirement of increasing importance, resistance of the finish to germicides. This additional requirement arises out of concerns about controlling the spread of infectious diseases. Thus, it has become common practice in such facilities to mop floors with germicides to eliminate a potential source of infection. These germicides usually contain either a phenolic derivative or quaternary ammonium salt as the biocidal agent. See for example U.S. Pat. No. 3,836,669.

When used at the proper dilution, the germicides are typically not harmful to floor finishes. However, in an effort to obtain an extra margin of safety, janitorial service staff commonly use germicides at concentrations higher than their label instructions recommend. This practice leads to the finish actually being stripped from the floor. There exists, therefore, a significant need to develop a floor finish which not only meets the stringent performance requirements of a floor polish but also exhibits excellent resistance to stripping by germicides.

According to the present invention, there is provided a floor finish composition formulated to have improved resistance to germicides without compromising floor polish performance requirements. The composition comprises a preservative, a wetting agent, a defoamer, a $C_1$-$C_4$ alkyl carbitol, a plasticizer, a freeze-thaw stabilizer, a low acid styrenated acrylic resin copolymer, a rosin ester resin, a wax, and water. High quality polish performance is achieved particularly where the ratio of rosin ester resin to wax is greater than 1.

Additional objects, features, and advantages of the invention will become apparent to those skilled in the art upon consideration of the following detailed description of the preferred embodiments exemplifying the best mode of carrying out the invention.

DETAILED DESCRIPTION OF THE INVENTION

In accordance with the present invention there is provided an improved floor finish composition which exhibits exceptional resistance to removal by germicide concentrates. The composition comprises a preservative, a wetting agent, a defoamer, a $C_1$-$C_4$ alkyl carbitol, a plasticizer, a freeze-thaw stabilizer, a rosin ester resin, a wax, an acrylic polymer, and water.

Testing of the present formulation has revealed that the stoichiometry/chemical nature of the wax, rosin ester resin and acrylic polymer ingredients, particularly the nature of the acrylic polymer component and the ratio of the rosin ester and wax components, should be held within predefined specifications to assure consistent high quality performance.

Acrylic polymers finding use in accordance with this invention are styrenated acrylic copolymers having an average molecular weight of about $5 \times 10^5$ to $1 \times 10^6$, most preferably about $8 \times 10^5$, and most preferably having a glass transition temperature of 50° C. Preferred acrylic copolymers for use in this invention are low acid (less than 8% acrylic acid) copolymers of hydrophobic monomers including styrene and 2-ethylhexyacrylate and hydrophilic monomers such as butyl, ethyl, and methyl acrylate (and methacrylate) and acrylic acid. One preferred acrylic polymer generally meeting those criteria is sold by Rohm & Haas under the tradename Rhoplex ® NTS 2923. Most preferably the styrenated acrylic resin forms about 13 to 17 weight percent of the present finish compositions. The wax component of the present finish compositions are preferably nonionic emulsions of polyethylene, most preferably having a molecular weight of about 5500 to about 7500. The rosin ester resin ingredient is a common alkali soluble resin detailed for use in high gloss floor finishes. In the present compositions it is preferred that the weight ratio of rosin ester resin to wax is greater than 1, more preferably about 1.5 to about 4, most preferably about 2 to about 3.

The floor finish compositions in accordance with the present invention typically includes about $1.5 \times 10^{-4}$ to about 0.15 weight percent preservative, about 0.001 to about 10 weight percent wetting agent, about 0.01 to about 10 weight percent defoamer, about 0.1 to about 15 weight percent $C_1$-$C_4$ alkyl carbitol, about 0.2 to about 30 weight percent plasticizer, about 0.1 to about 10 weight percent freeze-thaw stabilizer, about 8 to about 24 weight percent styrenated acrylic resin, about 0.025 to about 5 weight percent rosin ester resin, about 0.04 to about 6 weight percent wax, and water. Good finish characteristics are optimized where the weight ratios of the rosin ester resin to the wax is greater than 1.

The floor finish composition in accordance with the present invention is applied to surfaces in the same manner as present commercially available floor finish compositions. Acceptable surfaces for application include porous or non-porous surfaces commonly found in flooring, including vinyl, vinyl/asbestos, vinyl composition effective or filled vinyl, linoleum; resilient flooring composites; terrazzo; and marble.

The wax component of the present floor finish composition is effective to produce a coefficient of friction suitable for providing slip resistance for both high speed and conventional floor maintenance systems. Preferred waxes for use in accordance with this invention include polyethylenes, typically in non-ionic emulsion form, having a molecular weight of about 4,000 to about 10,000, more preferably about 5500 to about 7500. One preferred wax emulsion finding application in the present finish composition is ESI-CRYL 252 sold by Emulsion Systems, Inc., Valley Stream, N.Y. The floor finish compositions in accordance with the present invention include from about 0.04 to about 6 weight percent and preferably from about 0.04 to about 1.6 weight percent wax.

The rosin ester resin utilized in the germicidal resistant floor finish compositions of the present invention has a molecular weight of about 450 to about 500. One preferred rosin ester ingredient for this invention is that sold as a 25% solids solution by Emulsion Systems, Inc. Valley Stream, N.Y., under the tradename ESI-CRYL 802. Typically the present floor finish compositions include from about 0.025 to about 5 weight percent and preferably from about 1.5 to about 2.75 weight percent rosin ester.

In the present finish compositions the weight ratio of rosin ester to wax is most preferably greater than 1 for optimizing finish performance. Further, the weight ratio of the styrenated acrylic resin to the combined weight of wax and resin ester is about 3:1 to about 7:1, most preferably about 5:1.

The solvents utilized in accordance with the present invention are water miscible glycol ethers used alone or in combination. Preferably, the solvent component of the present is a mixture of diethylene glycol monobutyl ether and diethylene glycol monomethyl ether. Generally about 0.2 to about 30 weight percent, and more typically from about 2 to about 10 weight percent solvent is included. Preferably, the compositions of the present invention include about 0.1 to about 15, more preferably about 1 to about 5 weight percent diethylene glycol monobutyl ether and about 0.1 to about 15, more preferably about 1 to about 5, weight percent diethylene glycol monomethyl ether.

Plasticizers are used in the present compositions to obtain a coherent floor finish film. Examples of suitable plasticizers for use in accordance with the present invention include 2,2,4-trimethylpentane-1,3 diol monoisobutyrate, 2,2,4-trimethylpentane-1,3 diol diisobutyrate, tributoxy ethyl phosphate, and dibutyl phthalate, used alone or in combination. Preferably, the plasticizer component of the present invention is 2,2,4-trimethylpentane-1,3 diol monoisobutyrate such as Texanol ester/alcohol available from Eastman Chemical Products, and tributoxy ethyl phosphate available as product KP-140 from FMC Corporation. Typically the plasticizer component of the present floor finish composition is utilized at a level of about 0.2 to about 30 weight percent and more typically about 0.2 to about 6 weight percent of the finish composition. Preferably the present composition includes about 0.1 to about 15, more preferably about 0.1 to about 3, weight percent 2,2,4-trimethylpentane-1,3 diol monoisobutyrate and about 0.1 to about 15, more preferably about 0.1 to about 3, weight percent tributoxy ethyl phosphate.

The preservative component of the present invention serves to prevent growth of bacteria and fungus in the finish composition on prolonged storage. Any commercially available preservative is suitable for use in accordance with the present invention. One preferred preservative is a mixture of 5-chloro 2-methyl 4-isothiazolin 3-1 (CAS number 26172-554), 2-methyl 4-isothiazolin 3-1 (CAS number 2682-20-4), magnesium chloride, magnesium nitrate, and water, sold by Rohm & Haas under the tradename Kathon ® GC/ICP. Typically, compositions in accordance with the present invention include about $1.5\times10^{-4}$ to about 0.15 weight percent and preferably about $1.5\times10^{-4}$ to about 0.03 weight percent preservative.

Wetting agents suitable for use with the present invention can be selected from a wide variety of commercially available anionic and non-ionic surfactants. Anionic perfluoroalkyl sulfonate salts are preferred. One such wetting agent is a mixture of 2-butoxyethanol, water, and ammonium perchloroalkalisulfonate sold by the Industrial Chemical Products Division of 3M Corporation under the brand name FC-120 Fluorad. The composition in accordance with the present invention typically includes about 0.001 to about 10 weight percent and preferably from about 0.001 to about 2 weight percent wetting agent.

Suitable defoaming agents for use in preparing the present finish compositions can, like many of the other floor finish ingredients used in the present invention, be selected from a wide variety of art-recognized commercially available products. One preferred class of defoamers are the well known organosilicone emulsions, for example, polydimethylsiloxane emulsion including, for example, the SAG 1010 Silicone Antifoam Emulsion available from Union Carbide Corporation. The defoamer is used at a level of about 0.01 to about 10 weight percent and preferably about 0.01 to about 2 weight percent of the finish composition.

A freeze-thaw stabilizer is utilized in formulating the preferred floor finish composition of this invention to protect the composition from freeze/thaw cycles which can occur during shipment and storage. Preferably the freeze-thaw stabilizer component of the present compositions is ethylene glycol used at a level of about 0.1 to about 10 weight percent, and preferably from about 0.1 to about 2 weight percent of the finish compositions.

The present floor finish compositions also include from about 10 to about 75 weight percent water to control the solids and viscosity of the composition.

The stoichiometry and components of the present floor finish compositions are summarized in Table I. Compositions formulated outside these specifications will not retain one or more of the properties which are characteristic of quality floor finish. Based on currently available test results the most important parameters for consistent finish quality are the composition and stoichiometry of the acrylic polymer, the rosin ester and the wax.

TABLE I

| Ingredient Components | | Weight % Of Component Formulation | |
|---|---|---|---|
| Function | Component | Most Preferred | Full Range |
| Preservative | Kathon GC/ICP (1.5%) | 0.01–2 | 0.01–10 |
| Wetting agent | FC-120 (20%) | 0.001–2 | 0.001–10 |
| Defoamer | SAG 1010 | 0.01–2 | 0.01–10 |
| Solvent | Butyl carbitol | 1–5 | 0.1–15 |
| Solvent | Methyl carbinol | 1–5 | 0.1–15 |
| Plasticizer | Texanol ester/alcohol | 0.1–3 | 0.1–15 |
| Plasticizer | KP-140 | 0.1–3 | 0–15 |
| Freeze stabilizer | Ethylene glycol | 0.1–2 | 0.1–10 |
| Polymer | Rhoplex NTS-2923 (40%) | 35–40 | 25–60 |
| Rosin ester resin | Esicryl 802 (25%) | 6–11 | 0.1–20 |
| Wax | Esicryl 252 (40%) | 0.1–4 | 0.1–15 |
| Diluent | Water | 20–60 | 10–75 |

EXAMPLE I

A floor finish composition was formulated in accordance with the following specifications using standard floor finish formulation techniques.

| FLOOR FINISH FORMULATION | |
|---|---|
| Component | Weight Percentage |
| Kathon CG/ICP (1.5% biocide) | 0.04 |
| FC-120 Fluorad (20%) | 0.014 |
| SAG 1010 Silicone Antifoam | 0.03 |
| Butyl carbitol | 3.51 |
| Methyl carbitol | 3.06 |
| Texanol ester/alcohol | 1.13 |

-continued

FLOOR FINISH FORMULATION

| Component | Weight Percentage |
| --- | --- |
| KP-140 | 1.23 |
| Ethylene glycol | 0.5 |
| Rhoplex NTS-2923 (40%) | 37.96 |
| ESI-CRYL 802 (25% solids) | 8.47 |
| ESI-CRYL 252 (40% solids) | 2.03 |
| Water | 42.03 |

The germicidal resistance of the floor finish was determined as follows: 6 mL of a sealer was spread onto a 12×12 inch vinyl tile with a cotton gauze and allowed to dry. Next, using the same technique, a second coat of sealer was applied to the tile. After drying the sealer, one coat of the above floor finish formulation was applied over the sealer on the tile. A total of two coats of sealer and three coats of finish were applied to the vinyl tile. The dried finish composition exhibited the following characteristics: high gloss, scuff resistance, easy repairability, slip resistance, and detergent resistance according to the standards set forth by ASTM procedures. The test tiles were then placed in a Gardner scrubber and abraded for 100 cycles in the presence of several germicides used at 8 times their recommended dilution. The germicides utilized included acidic, neutral, and basic pH quaternary salt and phenolic formulations. No tile damage was noted in any case. Tiles similarly coated with conventional acrylic polymer finishes showed damage from finish stripping during abrasion in the presence of the germicides.

EXAMPLE II

Germicide strip resistant floor polish compositions A-E are formulated as indicated:

| Component | A | B | C | D | E |
| --- | --- | --- | --- | --- | --- |
| preservative | 0.5 | 0.01 | 1 | 0.08 | 1.0 |
| wetting agent | 0.1 | 0.01 | 5 | 0.005 | 0.2 |
| defoamer | 0.4 | 0.08 | 5 | 0.015 | 0.3 |
| solvent | 10 | 2 | 10 | 4.9 | 7 |
| plasticizer | 2 | .2 | 4 | 2.45 | 2 |
| freeze-thaw stabilizer | 1.65 | 6.7 | .9 | 1 | 0.1 |
| polymer | 40 | 55 | 30 | 34 | 37 |
| rosin ester | 2.75 | 6 | 2.6 | 3.55 | 5 |
| wax | 1.6 | 5 | 1.5 | 2.0 | 0.5 |
| diluent | 41 | 25 | 40 | 52.01 | 46.9 |

Although the invention has been described with reference to certain preferred embodiments, variations and modifications exist within the scope and spirit of the invention as described and defined in the following claims.

I claim:

1. A germicide resistant floor finish composition comprising
   about $1.5 \times 10^{-4}$ to about 0.15 weight percent biocidal preservative,
   about 0.001 to about 10 weight percent wetting agent,
   about 0.01 to about 10 weight percent defoamer,
   about 0.1 to about 15 weight percent $C_1$-$C_4$ alkyl carbitol,
   about 0.2 to about 30 weight percent plasticizer,
   about 0.1 to about 10 weight percent freeze-thaw stabilizer,
   about 8 to about 24 weight percent styrenated acrylic polymer,
   about 0.025 to about 5 weight percent of an rosin ester resin,
   about 0.04 to about 6 weight percent wax, and water, provided that the weight ratio of rosin ester resin to wax is greater than 1.

2. The finish composition of claim 1 wherein the ratio of rosin ester resin to wax is about 1.5 to about 4.0.

3. The finish composition of claim 1 wherein the ratio of rosin ester resin to wax is about 2 to about 3.

4. The finish composition of claim 2 wherein the styrenated acrylic resin forms about 13 to about 17 weight percent of the finish composition.

5. The finish composition of claim 4 wherein the weight ratio of rosin ester resin to wax is about 2 to about 3.

* * * * *